United States Patent [19]

Van Der Sluys et al.

[11] Patent Number: 5,128,112

[45] Date of Patent: Jul. 7, 1992

[54] SYNTHESIS OF ACTINIDE NITRIDES, PHOSPHIDES, SULFIDES AND OXIDES

[75] Inventors: William G. Van Der Sluys, Missoula, Mont.; Carol J. Burns; David C. Smith, both of Los Alamos, N. Mex.

[73] Assignee: The United States of America as represented by the United States of Department of Energy, Washington, D.C.

[21] Appl. No.: 679,487

[22] Filed: Apr. 2, 1991

[51] Int. Cl.$^5$ .................... C01G 43/00; C01G 56/00; C01F 15/00

[52] U.S. Cl. .................... 423/249; 423/250; 423/251; 423/252; 423/254; 423/261; 423/11; 423/351; 423/409; 423/299; 423/592; 501/96; 501/97; 501/152

[58] Field of Search ............ 423/251, 252, 253, 254, 423/260, 261, 250, 11, 351, 409, 299, 561 R, 592; 501/96, 97, 152

[56] References Cited

U.S. PATENT DOCUMENTS

| | | | |
|---|---|---|---|
| Re. 31,788 | 1/1985 | Iwai et al. | 423/290 |
| 3,334,974 | 8/1967 | Fletcher et al. | 423/409 |
| 3,758,669 | 9/1973 | Potter | 423/254 |
| 4,029,740 | 6/1977 | Ervin Jr. | 423/251 |
| 4,746,501 | 5/1988 | Maya | 423/413 |
| 4,826,666 | 5/1989 | Laine | 423/249 |
| 4,895,709 | 1/1990 | Laine | 423/344 |
| 4,906,493 | 3/1990 | Laine | 427/226 |
| 4,948,762 | 8/1990 | Krumbe et al. | 501/92 |
| 5,017,525 | 5/1991 | Birchall et al. | 501/87 |
| 5,026,809 | 6/1991 | Dietmar et al. | 528/4 |

OTHER PUBLICATIONS

Mat. Res. Soc. Symp. Proc. vol. 168, pp. 319–327 (1990) by Girolami et al. entitled "Low Temperature MOCVD Routes to Thin Films from Transition Metal Precursors".

Mat. Res. Soc. Symp. Proc. vol. 168, pp. 357–362 (1990) by Fix et al. entitled: "Titanium Nitride Thin Films: Properties and APCVD Synthesis Using Organometallic Precursors".

J. Am. Chem. Soc., vol. 112, No. 22, 1990, pp. 7989–7994 by Banaszak et al.

Andersen, R. A., Tris(hexamethyldisilyl)amido)uranium (III), Preparation and Coordination Chemistry, Inorg. Chem. vol. 18, No. 6; pp. 1507–1509.

Primary Examiner—Brooks H. Hunt
Assistant Examiner—Ngoclan T. Mai
Attorney, Agent, or Firm—Bruce H. Cottrell; Paul D. Gaetjens; William R. Moser

[57] ABSTRACT

A process of preparing an actinide compound of the formula $An_xZ_y$ wherein An is an actinide metal atom selected from the group consisting of thorium, uranium, plutonium, neptunium, and americium, x is selected from the group consisting of one, two or three, Z is a main group element atom selected from the group consisting of nitrogen, phosphorus, oxygen and sulfur and y is selected from the group consisting of one, two, three or four, by admixing an actinide organometallic precursor wherein said actinide is selected from the group consisting of thorium, uranium, plutonium, neptunium, and americium, a suitable solvent and a protic Lewis base selected from the group consisting of ammonia, phosphine, hydrogen sulfide and water, at temperatures and for time sufficient to form an intermediate actinide complex, heating said intermediate actinide complex at temperatures and for time sufficient to form the actinide compound, and a process of depositing a thin film of such an actinide compound, e.g., uranium mononitride, by subliming an actinide organometallic precursor, e.g., a uranium amide precursor, in the presence of an effective amount of a protic Lewis base, e.g., ammonia, within a reactor at temperatures and for time sufficient to form a thin film of the actinide compound, are disclosed.

13 Claims, No Drawings

SYNTHESIS OF ACTINIDE NITRIDES, PHOSPHIDES, SULFIDES AND OXIDES

FIELD OF THE INVENTION

The present invention relates to the field of inorganic synthesis and more particularly to the preparation of actinide compounds, i.e., actinide nitrides, actinide phosphides, actinide oxides or actinide sulfides, from organometallic precursors. This invention is the result of a contract with the Department of Energy (Contract No. W-7405-ENG-36).

BACKGROUND OF THE INVENTION

The synthesis of inorganic materials has often involved the use of high temperatures generally in excess of 1000° C. For example, current methods for the preparation of uranium mononitride involve the reaction of uranium and nitrogen at high temperatures or the use of a high energy nitrogen plasma. The initial product of such high temperature reactions is generally $U_2N_3$, which then decomposes above about 1300° C. to UN. In recent years there has been an increasing interest in development of synthetic techniques using relatively mild conditions, e.g., lower temperatures to obtain increased energy efficiency. High temperatures may also lead to other undesirable results.

It is an object of this invention to provide a low temperature process of preparing actinide compounds such as uranium nitrides, e.g., uranium mononitride, from suitable organometallic compounds.

It is a further object of this invention to provide a low temperature process of preparing other actinide compounds, e.g., thorium nitrides, plutonium nitrides, americium nitrides, thorium phosphides, uranium phosphides, plutonium phosphides, thorium oxides, uranium oxides, plutonium oxides, americium oxides, thorium sulfides, uranium sulfides, plutonium sulfides, or americium sulfides.

SUMMARY OF THE INVENTION

To achieve the foregoing and other objects, and in accordance with the purposes of the present invention, as embodied and broadly described herein, the present invention provides a process of preparing an actinide compound of the formula $An_xZ_y$ wherein An is an actinide metal atom selected from the group consisting of thorium, uranium, plutonium, neptunium, and americium, x is selected from the group consisting of one, two or three, Z is a main group element atom selected from the group consisting of nitrogen, phosphorus, oxygen and sulfur and y is selected from the group consisting of one, two, three or four, the process including admixing an actinide organometallic precursor wherein the actinide is selected from the group consisting of thorium, uranium, plutonium, neptunium, and americium, a suitable solvent, and a protic Lewis base selected from the group consisting of ammonia, phosphine, hydrogen sulfide and water, at temperatures and for time sufficient to form an intermediate actinide complex, and heating the intermediate actinide complex at temperatures and for time sufficient to form the actinide compound.

The present invention further provides a process of preparing an actinide nitride by admixing an actinide amide precursor, a suitable solvent, and ammonia, at temperatures and for time sufficient to form an intermediate actinide complex wherein the actinide is selected from the group consisting of thorium, uranium, plutonium, neptunium, and americium, and heating the intermediate actinide complex at temperatures and for time sufficient to form the actinide nitride. In one embodiment of the invention, the actinide nitride is uranium mononitride.

Finally, the present invention provides a process of depositing a thin film of an actinide compound, e.g., uranium mononitride, by subliming a volatile actinide organometallic precursor, e.g., a uranium amide precursor, in the presence of an effective amount of a protic Lewis base, e.g., ammonia, within a reactor containing a target substrate at temperatures and for time sufficient to form a thin film of the actinide compound, e.g., uranium mononitride, upon the substrate.

DETAILED DESCRIPTION

The present invention is concerned with the preparation of actinide compounds, i.e., actinide nitrides, actinide phosphides, actinide oxides or actinide sulfides, by a low temperature organometallic decomposition process. By "low temperature" is generally meant temperatures less than about 500° C., preferably from about 250° C. to about 400° C.

Such actinide compounds can be generally represented by the formula $An_xZ_y$ where An is an actinide metal atom selected from the group consisting of thorium, uranium, neptunium, plutonium or americium, x is an integer selected from the group consisting of one, two or three, z is a main group element atom selected from the group consisting of nitrogen, phosphorus, oxygen and sulfur, and y is an integer selected from the group consisting of one, two, three or four.

Previously, the preparation and coordination chemistry of the compound $U[N(SiMe_3)_2]_3$ was described by Andersen in Inorganic Chemistry, vol. 18, no. 6, pp. 1507–1509 (1979). However, Andersen indicated that the compound did not produce isolatable complexes upon reaction with Lewis bases such as carbon monoxide, trimethylphosphine, trimethylphosphine oxide, tetrahydrofuran, trimethylamine, pyridine, tert-butyl isocyanide and tert-butyl cyanide at room temperature and atmospheric pressure. The compound was described as reacting with the Lewis base trimethylamine oxide to form the oxo-compound. Accordingly, our discovery that reaction of the tris ((hexamethyldisilyl)amido)uranium compound with ammonia produces an insoluble green-black powder, which upon heating at from about 250° C. to about 350° C. yields black amorphous uranium mononitride, UN, was unexpected. By amorphous is meant that the resultant material did not diffract x-rays.

The process of the present invention follows from this discovery, namely, that preparation of an actinide compound of the formula $An_xZ_y$ wherein An is an actinide metal atom selected from the group consisting of thorium, uranium, plutonium, neptunium, and americium, x is selected from the group consisting of one, two or three, z is a main group element atom selected from the group consisting of nitrogen, phosphorus, oxygen and sulfur and y is selected from the group consisting of one, two, three or four, can be accomplished by: (1) admixing (a) an actinide organometallic precursor capable of reacting with a protic Lewis base selected from the group consisting of ammonia ($NH_3$), phosphine ($PH_3$), hydrogen sulfide ($H_2S$) and water ($h_2O$), wherein said actinide metal of the actinide organometallic precursor is selected from the group consisting of thorium, uranium, plutonium, neptunium, and americium, (b) a suitable solvent, and (c) a protic Lewis base selected from the group consisting of ammonia, phosphine, hydrogen sulfide and water, at temperatures and for time sufficient to form an intermediate actinide complex; and, (2) heating said intermediate actinide complex at temperatures and for time sufficient to form the actinide compound.

An advantage of this organometallic process for preparation of actinide compounds such as UN is the lower processing temperature. Additionally, other advantages in the preparation of UN include the small particle size of the resultant UN indicating a very high surface area and an apparent reduction of oxide impurities in the UN material as indicated by the pyrophoricity of the product. UN material formed by the conventional high temperature process is an air-stable crystalline material. While not wishing to be bound by the present explanation, it is believed that the material is air-stable because of a surface oxide coating formed in the preparation. Other $U_xN_y$ species may be prepared from other uranium amide precursors.

Further, reaction of such an actinide amide precursor, e.g., $U[N(SiMe_3)_2]_3$, with phosphine, water or hydrogen sulfide may allow for the preparation of actinide compounds, such as actinide phosphides, actinide sulfides or actinide oxides.

The present process of preparing actinide nitrides includes the reaction of suitable organometallic precursors, e.g., actinide amide precursors, with the protic Lewis base ammonia. The reaction can be conducted within a suitable solvent or may be conducted in the gas phase by directly reacting ammonia with such an actinide amide precursor in the gas phase for a chemical vapor process, e.g., chemical vapor deposition. For the preparation of actinide phosphides, the process involves the reaction of suitable organometallic precursors with the protic Lewis base phosphine. Similarly, for the preparation of actinide sulfides, the process involves the reaction of suitable organometallic precursors with the protic Lewis base hydrogen sulfide, and for the preparation of actinide oxides, the process involves the reaction of suitable organometallic precursors with water.

Suitable organometallic precursors can include various complexes or compounds containing the actinide metal, e.g., uranium(III) compounds, uranium(IV) compounds, thorium(IV) compounds, plutonium(III) compounds, and americium(III) compounds. Such organometallic precursors should be soluble in non-polar, non-coordinating solvents for ease of reaction with the protic Lewis base and preferably such organometallic precursors will have sufficient volatility to permit gas phase reaction such as in a CVD process. Among the suitable precursors having sufficient volatility for CVD are amido compounds of the actinide metals, e.g., tris(-(hexamethyldisilyl)amido)uranium, tris((hexamethyldisilyl)amido)plutonium, di[tetra((diethyl)amido)uranium], and di[tetra((diethyl)amido)thorium]. Other suitable organometallic precursors for reaction in a solvent process are benzyl compounds of the actinide metals, e.g., tetrakis-benzyl uranium and tetrakis-benzyl thorium. Generally, the amido-type organometallic precursors, e.g., tris((hexamethyldisilyl)amido)uranium, are preferred.

Reaction of the organometallic precursor, e.g., an actinide amide precursor, with the particular protic Lewis base can be conducted in a suitable solvent for preparation of bulk powders or may be conducted without solvent in a CVD process. Such suitable solvents are preferably non-polar and non-coordinating and can generally include hydrocarbons, e.g., aliphatic or cyclic hydrocarbons such as pentane, hexane, heptane, or cyclohexane, and aromatic hydrocarbons such as benzene, toluene, or xylene. Hexane is preferred as the non-polar, non-coordinating solvent. By "non-coordinating" is meant that the solvent will not coordinate with the actinide metals and form stable complexes.

In one embodiment of the present invention, an actinide amide precursor, e.g., $U[N(SiMe_3)_2]_3$, is dissolved in hexane and the solution is maintained in contact with an atmosphere of the particular Lewis base, e.g., ammonia, at temperatures near ambient for sufficient time for reaction, generally from about one half hour to about two hours. Preferably, the solution is stirred for better reaction. After completion of the reaction, the resultant product is an intermediate actinide amide product. The intermediate actinide amide product is subsequently heated for time and at temperatures sufficient to convert the intermediate actinide amide product to the corresponding actinide compound, e.g., uranium nitride. Such temperatures are generally above about 250° C., more preferably from about 250° C. to about 350° C.

The uranium amide precursor, $U[N(SiMe_3)_2]_3$, is volatile. Therefore, thin films of UN may also be prepared by chemical vapor deposition, e.g., by sublimation of the amide starting material into a reactor containing a partial pressure of ammonia. In such a CVD process, the volatile amide precursor may be sublimed and passed over a target substrate in a suitable reactor, e.g., a cold walled reactor or a hot walled reactor, as a separate stream of ammonia is passed over the same substrate. The stream of ammonia may be passed onto the target substrate in a parallel or perpendicular fashion to the sublimed amide precursor or in other suitable fashion sufficient to provide adequate contact or mixing. The substrate may be heated at temperatures, generally in the range of from about 300° C. to about 500° C. for sufficient time to form the UN. By such a CVD process, it may be possible to deposit an actinide compound, e.g., an actinide nitride such as uranium mononitride, onto various target substrates such as alumina or silica, and metals, e.g., rhenium, tungsten or niobium.

By "thin film" it is meant a film having a thickness generally from about 10 nanometers to about 1 micron, although the thickness can be greater if the process is conducted for a greater period of time.

The present invention is more particularly described in the following examples which are intended as illustrative only, since numerous modifications and variations will be apparent to those skilled in the art.

EXAMPLE 1

Tris((hexamethyldisilyl)amido)uranium ($U[N(SiCH_3)_2]_3$) was prepared in a manner analogous to that of Andersen, Inorganic Chemistry, V. 18, no. 6, 1507–1509 (1979), with the difference that a tetrahydrofuran adduct of $UI_3$ was prepared in accordance with Clark et al., Inorganic Chemistry, V. 28, 1771–1773 (1989) and subsequently reacted with sodium(hexamethyldisilyl)amide rather than first reducing $UCl_4$. Under a helium atmosphere in a Schlenk flask within a dry box, 1.0 gram (g) of the $U[N(SiCH_3)_2]_3$ was dissolved in 10 milliliters (ml) of hexane. The flask was removed from the dry box and using a high vacuum line, the helium atmosphere was removed and replaced with an atmosphere of ammonia. The color immediately changed from red-purple to black and a black precipitate was formed. The solution was stirred for one hour after which the solvent was removed in vacuo and additional pumping under vacuum was continued for one hour. The black powder was air sensitive and as a result no analysis was conducted.

EXAMPLE 2

Into about 20 milliliters (ml) of hexane 0.5 g of $U[N(SiCH_3)_2]_3$ was dissolved. The hexane solution of $U[N(SiCH_3)_2]_3$ was exposed to one atmosphere of ammonia. A dark brown-black precipitate was formed over several minutes. After a period of two hours, the solvent and other volatiles were removed in vacuo. The precipitate was washed twice with hexane and dried under vacuum ($10^{-5}$ torr) for about 12 hours. Elemental analysis of the precipitate showed a composition of C:5.42; H:1.65; and N:9.35. The solid was placed in a glass tube on a vacuum line and gently heated with an oil bath whereupon volatiles were released. After additional volatile material generation stopped, the resultant material was placed in a dry box. Elemental analysis of this material showed a composition of C:0.16; H:0.05; and N:6.59. This analysis supports the conclusion that the resultant material was uranium mononitride. Further, the material exhibited pyrophoricity and had a ultrafine particle size as indicated by the failure of the material to diffract x-rays thereby indicating less than nanocrystalline dimensions.

Although the present invention has been described with reference to specific details, it is not intended that such details should be regarded as limitations upon the scope of the invention, except as and to the extent that they are included in the accompanying claims.

What is claimed is:

1. A process of preparing an actinide compound of the formula $An_xZ_y$ wherein An is an actinide metal atom selected from the group consisting of thorium, uranium, plutonium, neptunium, and americium, x is selected from the group consisting of one, two or three, z is a main group element atom selected from the group consisting of nitrogen, phosphorus, oxygen and sulfur, and y is selected from the group consisting of one, two, three or four, comprising:

admixing an actinide organometallic precursor capable of reacting with a protic Lewis base selected from the group consisting of ammonia, phosphine, hydrogen sulfide and water, wherein said actinide is selected from the group consisting of thorium, uranium, plutonium, neptunium, and americium, a non-polar, non-coordinating solvent, and a protic Lewis base selected from the group consisting of ammonia, phosphine, hydrogen sulfide and water, at temperatures and for time sufficient to form a reaction product of said actinide organometallic precursor and said protic Lewis base;

heating said reaction product at temperatures and for time sufficient to form the actinide compound.

2. The process of claim 1 wherein An is uranium, z is nitrogen, and the protic Lewis base is ammonia.

3. The process of claim 2 wherein the heating of said reaction product is at temperatures of from about 300° C. to about 400° C.

4. The process of claim 2 wherein the actinide organometallic precursor is $U[N(SiCH_3)_2]_3$.

5. A process of preparing an actinide nitride comprising:

admixing an actinide amide precursor capable of reacting with ammonia, a non-polar, non-coordinating solvent, and ammonia, at temperatures and for time sufficient to form a reaction product of said actinide amide precursor and said ammonia wherein said actinide is selected from the group consisting of thorium, uranium, plutonium, neptunium, and americium;

heating said reaction product at temperatures and for time sufficient to form the actinide nitride.

6. The process of claim 5 wherein the actinide is uranium.

7. The process of claim 6 wherein the heating of said reaction product is at temperatures of from about 300° C. to about 400° C.

8. The process of claim 6 wherein the actinide amide precursor is $U[N(SiCH_3)_2]_3$.

9. A process of preparing uranium nitride comprising:

admixing a uranium amide precursor, a non-polar non-coordinating solvent and ammonia, at temperatures and for time sufficient to form heating said reaction product at temperatures and for time sufficient to form uranium nitride.

10. The process of claim 9 wherein the heating of said reaction product is at temperatures of from about 300° C. to about 400° C.

11. The process of claim 9 wherein the uranium amide precursor includes uranium in a plus 3 oxidation state 12. The process of claim 9 wherein the uranium amide precursor includes uranium in a plus 4 oxidation state.

13. The process of claim 9 wherein the uranium amide precursor is $U[N(SiCH_3)_2]_3$.

* * * * *